United States Patent
Rosenblum (10) Patent No.: US 7,349,153 B2
(45) Date of Patent: Mar. 25, 2008

(54) TOY WEAPON WITH A PERISCOPE SUITABLE FOR ALLOWING A USER TO VIEW OBSTRUCTED OBJECTS THROUGH THE PERISCOPE

(75) Inventor: Brian Rosenblum, Sherman Oaks, CA (US)

(73) Assignee: Jakks Pacific, Inc., Malibu, CA (US)

( * ) Notice: Subject to any disclaimer, the term of this patent is extended or adjusted under 35 U.S.C. 154(b) by 138 days.

(21) Appl. No.: 11/182,485

(22) Filed: Jul. 14, 2005

(65) Prior Publication Data

US 2007/0012720 A1    Jan. 18, 2007

(51) Int. Cl.
G02B 23/08    (2006.01)

(52) U.S. Cl. .................. 359/402; 359/406; 463/401; 222/79

(58) Field of Classification Search ............. D21/573
See application file for complete search history.

(56) References Cited

U.S. PATENT DOCUMENTS

| | | | | |
|---|---|---|---|---|
| 2,391,659 | A | * | 12/1945 | Trafford .................. 359/403 |
| 2,627,132 | A | * | 2/1953 | Dolgacius .................. 42/118 |
| 3,262,440 | A | * | 7/1966 | Kuhn .................. 124/67 |
| 3,441,270 | A | * | 4/1969 | Nielsen .................. 446/473 |
| 4,132,028 | A | * | 1/1979 | Ogawa .................. 446/94 |
| 4,750,641 | A | | 6/1988 | Chin-Fu |
| 4,878,305 | A | * | 11/1989 | Gabrielidis .................. 42/72 |
| D344,108 | S | | 2/1994 | Shirai et al. |
| D353,169 | S | | 12/1994 | Shirai et al. |
| 5,419,458 | A | | 5/1995 | Mayer |
| D359,087 | S | | 6/1995 | Caminos et al. |
| 5,662,244 | A | | 9/1997 | Liu et al. |
| D393,022 | S | | 3/1998 | Nagel |
| 5,782,228 | A | | 7/1998 | Wu |
| D398,035 | S | * | 9/1998 | Rowe .................. D22/103 |
| D401,977 | S | | 12/1998 | Wong |
| 5,886,839 | A | | 3/1999 | Arnone et al. |
| D416,954 | S | | 11/1999 | Yu |
| D426,592 | S | | 6/2000 | Zimmerman |
| D426,593 | S | | 6/2000 | Zimmerman |
| D427,251 | S | | 6/2000 | D'Andrade et al. |

(Continued)

FOREIGN PATENT DOCUMENTS

EP    0 753 716    7/1996

*Primary Examiner*—Stephone B. Allen
*Assistant Examiner*—Lee Fineman
(74) *Attorney, Agent, or Firm*—Tope-McKay & Associates (57) ABSTRACT

Described is a toy weapon with a periscope suitable for allowing a user to view obstructed objects through the periscope. The toy weapon comprises a weapon-shaped body with a trigger attached with the body. A user may activate the trigger with a finger to shoot the toy weapon. The periscope is attached with the body. The periscope includes an eye piece and a viewing piece, formed to allow a user to point the viewing piece at an object and view the object through the eye piece. In a desired aspect, the toy weapon is a water gun. In this aspect, a pressurized tank is attached with the trigger and the body. A pressure pump is connected with the pressurized tank to allow a user to build up water pressure within the tank. Depressing the trigger causes water stored within the tank to be expelled from the tank toward an object.

37 Claims, 6 Drawing Sheets

U.S. PATENT DOCUMENTS

| | | |
|---|---|---|
| D429,778 S | 8/2000 | D'Andrade et al. |
| D433,074 S | 10/2000 | Clemmer |
| D433,079 S | 10/2000 | Zimmerman |
| D441,039 S | 4/2001 | Greenberg et al. |
| D458,975 S | 6/2002 | Hornsby et al. |
| 6,400,503 B1 * | 6/2002 | Mickelson ................ 359/405 |
| 6,474,507 B1 * | 11/2002 | Hornsby et al. ............. 222/79 |
| D478,639 S | 8/2003 | Menow et al. |
| D479,286 S | 9/2003 | Menow et al. |
| D485,872 S | 1/2004 | Yaschur |
| 6,715,227 B2 | 4/2004 | Swain |
| D505,165 S | 5/2005 | McBride et al. |
| 2003/0051719 A1 | 3/2003 | Vanek et al. |
| 2005/0074277 A1 | 4/2005 | Brown et al. |

* cited by examiner

TOY WEAPON WITH A PERISCOPE SUITABLE FOR ALLOWING A USER TO VIEW OBSTRUCTED OBJECTS THROUGH THE PERISCOPE

BACKGROUND OF THE INVENTION (1) Field of Invention

The present invention relates to a toy weapon and, more particularly, to a toy weapon having a periscope to allow a user to view obstructed objects through the periscope.

(2) Description of Related Art

Toy weapons have long been known in the art. Toy weapons have been devised to include pellet guns, water guns, dart guns, bow and arrow weapons, among others. When using a toy weapon, a user typically points the toy weapon at a target and fires.

However, in some cases, particularly when coming under hostile fire, a user may elect to hide behind an object to protect oneself and/or maintain an element of surprise. A problem associated with hiding behind an object is that the user is unable to view the obstructed target.

Thus, a continuing need exists for a toy weapon that is suitable for allowing a user to view obstructed targets while hiding behind an object.

SUMMARY OF INVENTION

The present invention relates to a toy weapon. The toy weapon comprises a weapon-shaped body with a trigger attached with the weapon-shaped body. Additionally, a periscope is attached with the weapon-shape body. The periscope comprises a length, a front periscope portion, a back periscope portion, a viewing piece, and an eye piece. The viewing piece is connected with the front periscope portion and the eye piece is connected with the back periscope portion, whereby a user views obstructed objects through the periscope by looking through the eye piece.

In another aspect, the toy weapon is formed in a shape selected from a group consisting of: a gun; a rifle; a launcher; a missile gun; laser gun; a machine gun; a bow; and a crossbow.

In yet another aspect, the toy weapon emits at least one of: water; a pellet; a dart; a paint ball; a laser beam; a toy grenade, a toy quarrel; and an toy arrow.

In another aspect, the periscope further comprises an adjustable length, whereby a user adjusts the length of the periscope in order to see around obstructions of a plurality of sizes.

In yet another aspect, the viewing piece is oriented at a viewing angle and the periscope further comprises a viewing pivot for adjusting the viewing angle. The viewing piece is attached with the viewing pivot and the viewing pivot is connected with the front periscope portion, whereby a user adjusts the viewing angle by using the viewing pivot in order to see around obstructions.

In another aspect, the periscope is a telescopic periscope.

In yet another aspect, an object viewed through the periscope has an un-magnified size, and wherein the periscope comprises a magnifier for making an object appear larger than the un-magnified size of the viewed object, whereby a user views distant objects by using the magnifier.

In yet another aspect, the periscope further comprises a magnification controller for allowing a user to control how much to magnify a distant object.

In another aspect, the periscope further comprises a plurality of magnification factors, whereby in order to choose how much to magnify a distant object a user selects a particular magnification factor from the plurality of magnification factors by using the magnification controller.

In yet another aspect, the eye piece is oriented at an orientation angle and the periscope further comprises an orientation pivot for adjusting the orientation angle of the eye piece. The eye piece is attached with the orientation pivot and the orientation pivot is connected with the back periscope portion, whereby the user adjusts the orientation angle of the eye piece by using the orientation pivot in order to view objects over around an obstruction.

Additionally, the toy weapon comprises a water gun, and wherein the water gun further comprises:
  a pressurized tank for storing water at high water pressure, wherein the pressurized tank is attached with the weapon-shape body, and wherein the pressurized tank further comprises:
    a shooting nozzle for directing a flow of water out of the pressurized tank, wherein the shooting nozzle is connected with the pressurized tank; and
    an openably closable aperture connected with the pressurized tank to enable filling the pressurized tank with a volume of water; and
  a pressure pump for building up the water pressure inside the pressurized tank, wherein the pressure pump is connected with the pressurized tank.

In yet another aspect, the pressure pump comprises a manual pressure pump, whereby a user slides the manual pressure pump back and forth building up the water pressure inside the pressurized tank during only one of the forward and reverse motions of the pressure pump.

In another aspect, the manual pressure pump is a dual-action pump, whereby the dual-action pump builds up the water pressure when a user slides the dual-action pump in a forward motion and also builds up the water pressure when a user slides the dual-action pump in a backwards motion.

In another aspect, the periscope is permanently integrated into the weapon-shape body of the water gun.

In another aspect, the pressurized tank is a molded pressurized tank built using a molding construction technique, wherein the molded pressurized tank is molded in order to build higher water pressure inside the molded tank than the water pressure built inside a non-molded tank, thereby allowing a user to shoot water at a longer distance and with more strength.

In yet another aspect, the viewing angle of the viewing piece is adjusted from about zero degrees to about 360 degrees.

In another aspect, the periscope is detachably attached with the weapon-shape body of the water gun.

Furthermore, the orientation angle of the eye piece is adjusted from about zero degrees to about 180 degrees, whereby the user adjusts the orientation angle of the eye piece to approximately 90 degrees by using the orientation pivot in order to view objects over a tall obstacle, the user adjusts the orientation angle of the eye piece to approximately 180 degrees in order to view an object around an obstacle while the user aims forward with the toy weapon using a right handed aim, and the user adjusts the orientation angle of the eye piece to approximately zero degrees in order to view an object around an obstacle while the user aims forward with the toy weapon using a left handed aim.

Finally, as can be appreciated by one skilled in the art, the present invention also comprises a method for forming the periscope water gun described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a toy weapon and, more particularly, to a toy weapon having a periscope to allow a user to view obstructed objects through the periscope. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, an introduction is presented to provide the reader with a general understanding of the present invention. Next, a description of various aspects of the present invention is provided to give an understanding of the specific details.

(1) Introduction

The present invention relates to a toy weapon. When using a toy weapon, a user typically aims the weapon at the target and then fires the toy weapon. However, in some cases, particularly when coming under hostile fire, a user may elect to hide behind an object to protect oneself and/or maintain an element of surprise.

In order to allow a user to view an obstructed target (or object) while hiding behind an object, a toy weapon that includes a periscope is taught herein. With use of the periscope, a user may hide behind an object and extend a viewing piece of the periscope beyond a perimeter of the object, thereby allowing a user to view the target through the periscope.

(2) The Toy Weapon

Figure 1:
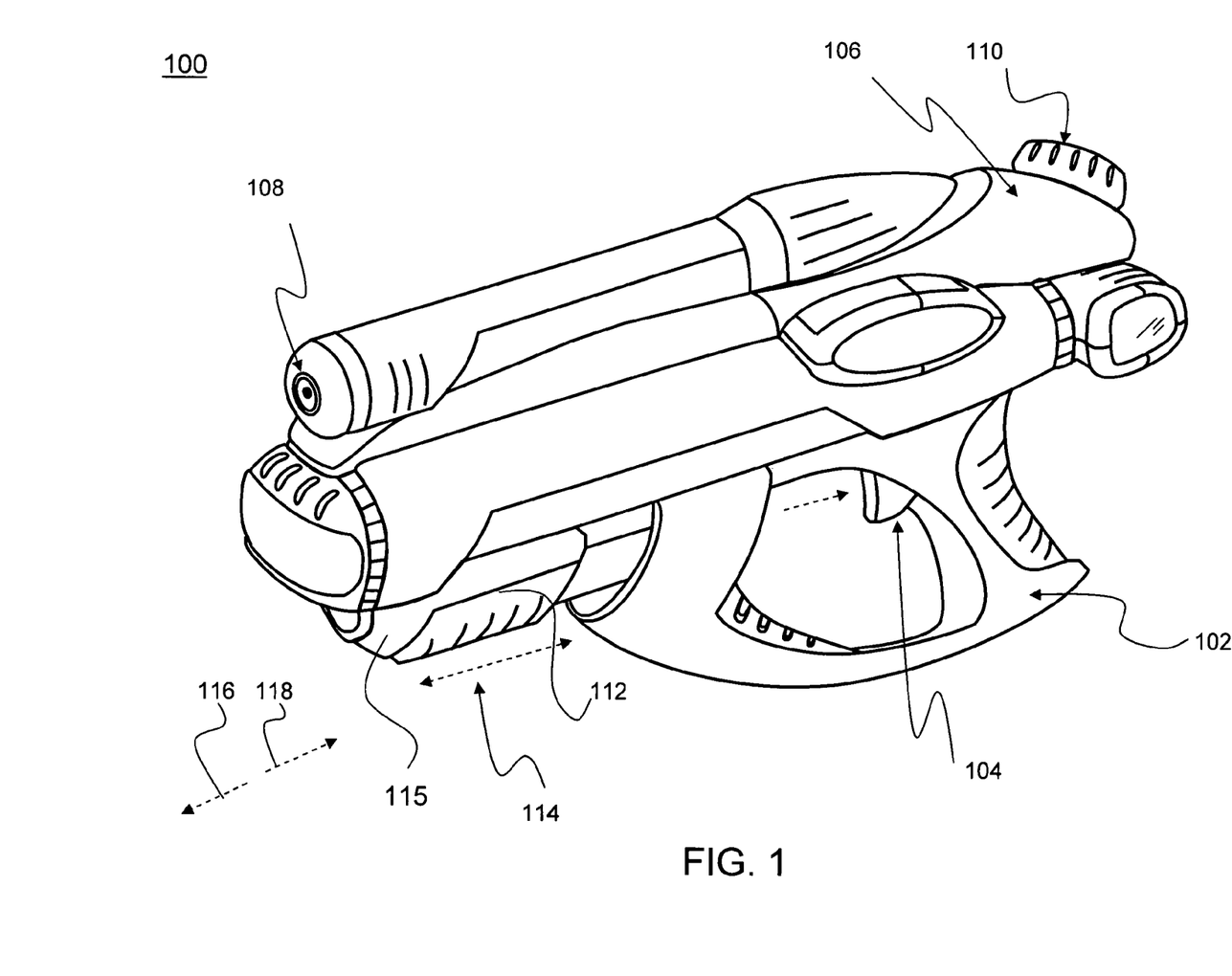
FIG. 1 is a perspective-view illustration of a toy weapon with a periscope according to the present invention.

As shown in FIG. 1, the present invention is a toy weapon 100. The toy weapon 100 includes a weapon-shaped body 102. A trigger 104 is attached with the weapon-shape body 102. The trigger 104 is formed to allow a user to activate the trigger 104 with a finger to shoot the toy weapon 100.

As a water gun, the toy weapon 100 further includes a pressurized tank 106 attached with the weapon-shape body 102 for storing water at high water pressure. A shooting nozzle 108 is connected with the pressurized tank 106 for speeding up and directing a flow of water out of an interior the pressurized tank 106. An openably closable aperture 110 is connected with the pressurized tank 106 to enable a user to fill the pressurized tank 106 with a volume of water. A pressure pump 112 is connected with the pressurized tank 106 for building up water pressure inside the pressurized tank 106.

As a water gun, the toy weapon 100 further includes a pressurized tank 106 attached with the weapon-shape body 102 for storing water at high water pressure. A shooting nozzle is connected with the pressurized tank 106 for speeding up and directing a flow of water out of an interior the pressurized tank 106. An openably closable aperture 110 is connected with the pressurized tank 106 to enable a user to fill the pressurized tank 106 with a volume of water. A pressure pump 112 is connected with the pressurized tank 106 for building up water pressure inside the pressurized tank 106.

The pressure pump 112 is a manual pressure pump 112, formed to allow a user to slide 114 a handle 115 on the manual pressure pump 112 back and forth to build up the water pressure. As can be appreciated by one skilled in the art, the pressure pump 112 can be formed to be either single or dual-action pump. When a single-action pump, the pressure pump 112 is capable of building up water pressure inside the pressurized tank 106 during only one of the forward 116 and reverse 118 motions of the pressure pump 112. Alternatively, when a dual-action pump, the pressure pump 112 is capable of building up the water pressure when a user slides the handle 115 of the dual-action pump in either the forward 116 and reverse 118 motions.

To allow a user to shoot water at a longer distance and with more power, the pressurized tank 106 is built using a molding construction technique, thereby forming a molded pressurized tank. By forming a molded pressurized tank, the pressurized tank is capable of withholding a higher interior water pressure than a non-molded tank.

Figures 2A, 2B:
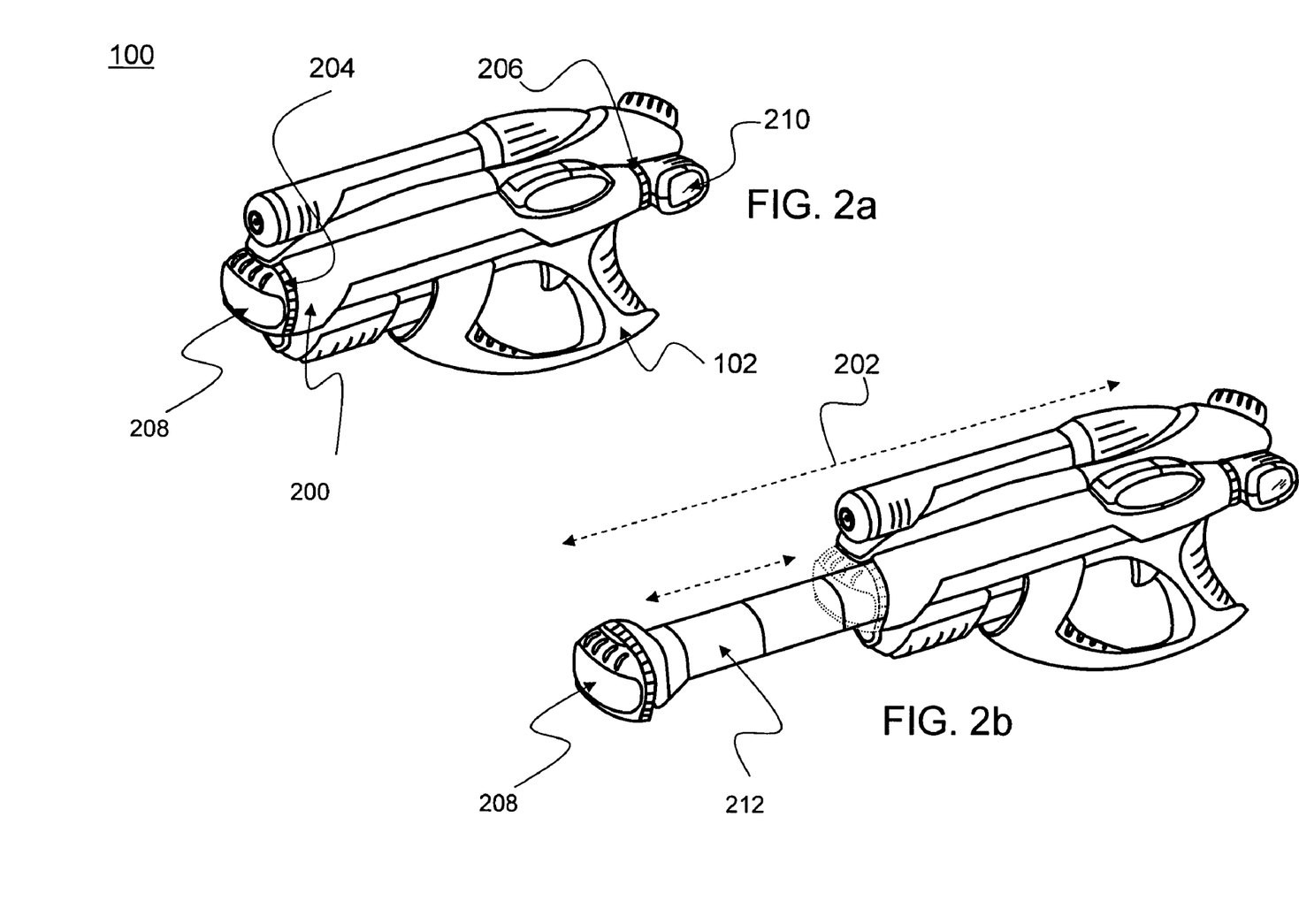
FIG. 2A is a perspective-view illustration of a toy weapon according to the present invention, illustrating a periscope partially encompassed within the toy weapon.
FIG. 2B is a perspective-view illustration of a toy weapon according to the present invention, illustrating the periscope being extended from the toy weapon.

As shown in FIG. 2A, a periscope 200 is attached with the weapon-shape body 102. The periscope 200 includes a length 202, a front periscope portion 204, a back periscope portion 206, a viewing piece 208, and an eye piece 210. The viewing piece 208 is connected with the front periscope portion 204 and the eye piece 210 is connected with the back periscope portion 206. As can be appreciated by one skilled in the art, the periscope 200 includes reflective surfaces (e.g., mirrors) that allow a user to view an obstructed object through the periscope 200 by pointing the viewing piece 208 at the object and looking through the eye piece 210.

The periscope 200 may be formed such that it is either detachably attachable with, or permanently integrated into, the weapon-shape body 102 of the water gun. In a desired aspect, the periscope is permanently affixed with the toy weapon 100.

As shown in FIG. 2A, the periscope 200 is formed such that its length 202 is an adjustable length, thereby allowing a user to adjust the length 202 of the periscope 200 to extend its reach. By adjusting the length 202 of the periscope 200, a user may see around obstructions of a plurality of sizes. The adjustable length is formed through any suitable mechanism or technique for selectively adjusting the length of an object, a non-limiting example of which includes having a telescoping tube 212 such that the periscope 200 is a telescopic periscope 200.

Figures 3A, 3B:
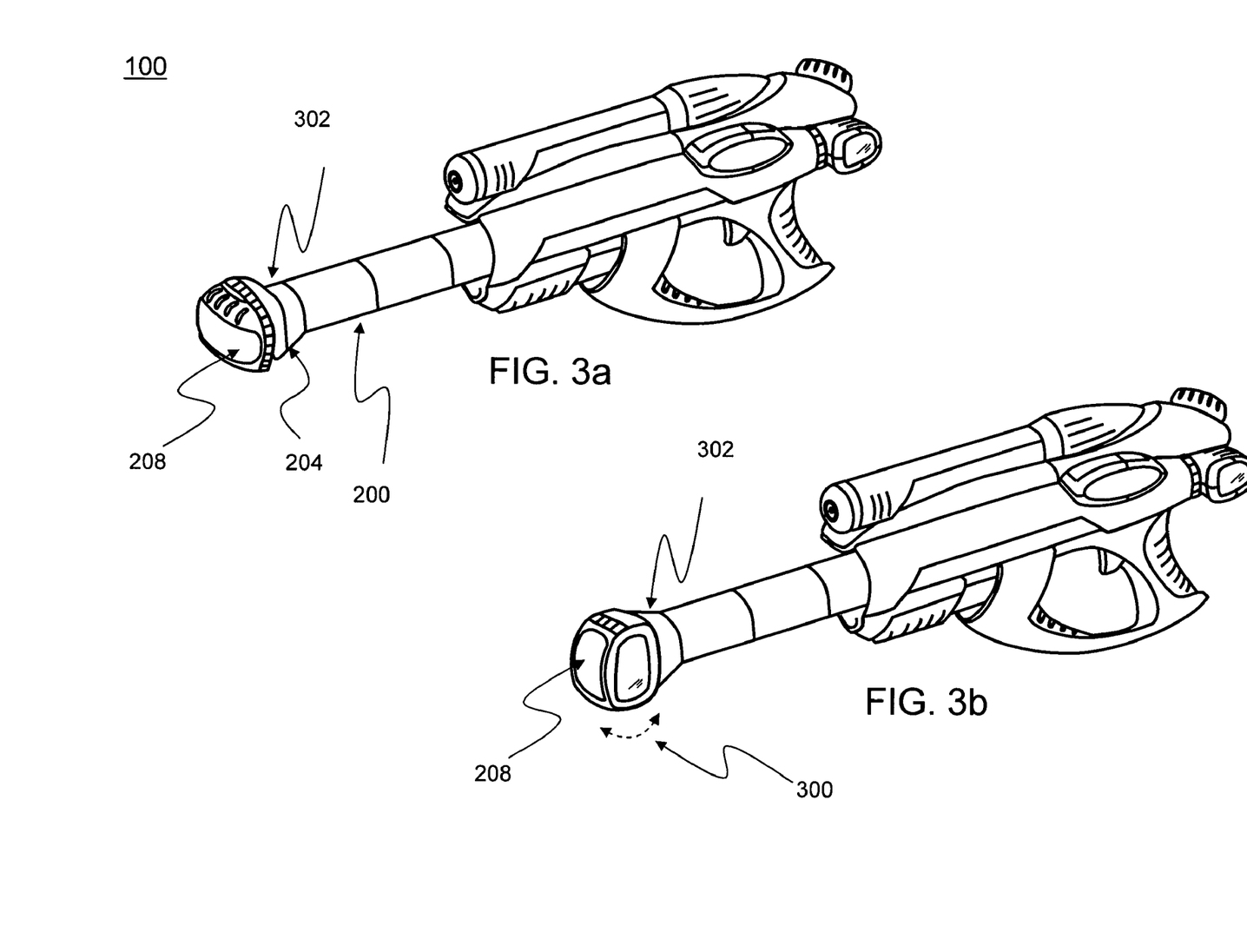
FIG. 3A is a perspective-view illustration of a toy weapon according to the present invention, illustrating an extended periscope.
FIG. 3B is a perspective-view illustration of a toy weapon according to the present invention, illustrating a viewing pivot of a viewing piece that permits a user to view a target from different viewing angle.

As shown in FIGS. 3A and 3B, the viewing piece 208 is oriented at a viewing angle 300. The viewing piece 208 is attached with a viewing pivot 302 (connected at the front periscope portion 208) to adjust the viewing angle 300. The viewing pivot 302 is any suitable mechanism or device for allowing two connected objects to pivot around a common central axis, a non-limiting example of which includes a pivot joint with a ring positioned within a larger ring-shaped groove. A user may adjust the viewing angle 300 by using the viewing pivot 302 to turn the viewing piece 208.

To allow a user to look at objects in any direction from the toy weapon 100, the viewing angle 300 of the viewing piece 208 can be adjusted to any angle (i.e., from about zero degrees to about 360 degrees).

Figure 4A:
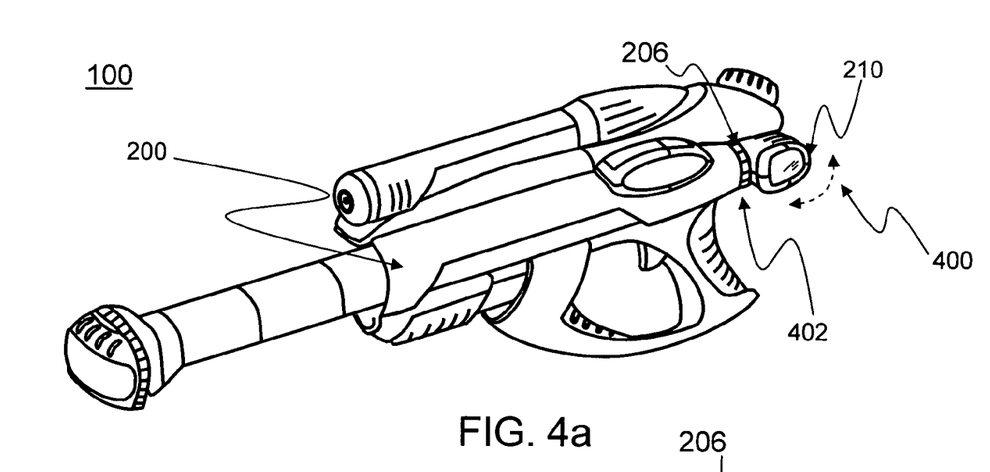
FIG. 4A is a perspective-view illustration of a toy weapon according to the present invention, illustrating an extended periscope.
Figure 4B:
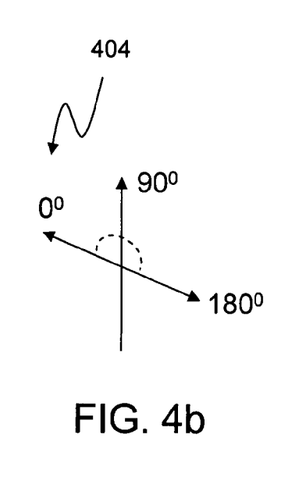
FIG. 4B is an eye piece orientation coordination system according to the present invention.
Figure 4C:
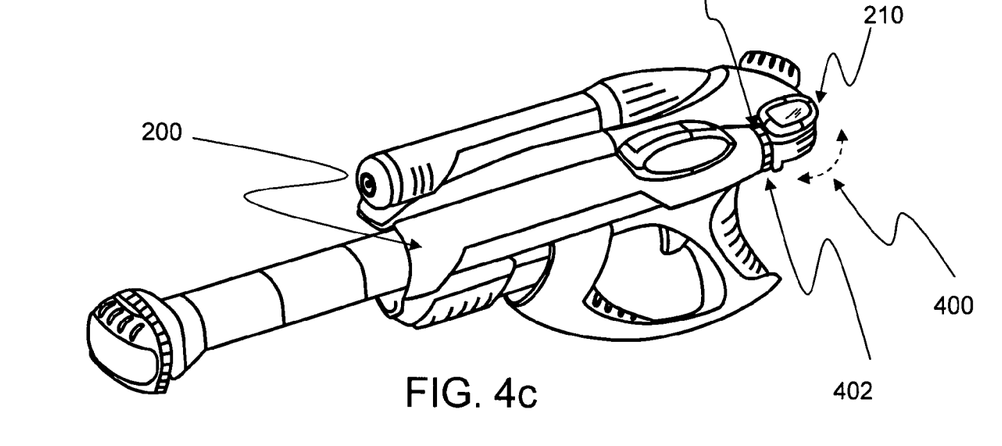
FIG. 4C is a perspective-view illustration of a toy weapon according to the present invention, illustrating a pivot of an eye piece to allow a user to use a different orientation angle.

As shown in FIGS. 4A through 4C, the eye piece 210 is orientated at an orientation angle 400. The eye piece 210 is attached with an orientation pivot 402 (connected at the back periscope portion 206) to adjust the orientation angle 400 of the eye piece 210. The orientation pivot 402 is any suitable mechanism or device for allowing two connected objects to pivot around a common central axis, a non-limiting example of which includes a pivot joint with a ring positioned within a larger ring-shaped groove. The orientation angle 400 of the eye piece 210 can be adjusted using the orientation pivot 402.

FIG. 4B illustrates an eye piece coordination system 404, showing adjustment of the eye piece 210 to change the orientation angle 400. The orientation pivot 402 can be formed such that the orientation angle 400 can be adjusted to any angle. As a non-limiting example, the orientation pivot 402 is formed so that the orientation angle 400 can be adjusted between zero degrees and 180 degrees. For example, to allow a user to look into the eye piece 210 from various angles, a user adjusts the orientation angle 400 of the eye piece 210 as shown in the eye piece coordination system 404. A user may adjust the orientation angle 400 of the eye piece 210 to approximately 90 degrees in order to view objects over a tall obstacle. Alternatively, a user may adjust the orientation angle 400 of the eye piece 210 to approximately 180 degrees in order to view an object around an obstacle while the user aims the toy weapon 100 forward using a right handed aim. As another non-limiting example, a user may adjust the orientation angle 400 of the eye piece 210 to approximately zero degrees in order to view an object around an obstacle while the user aims the toy weapon forward using a left handed aim.

Figure 5:
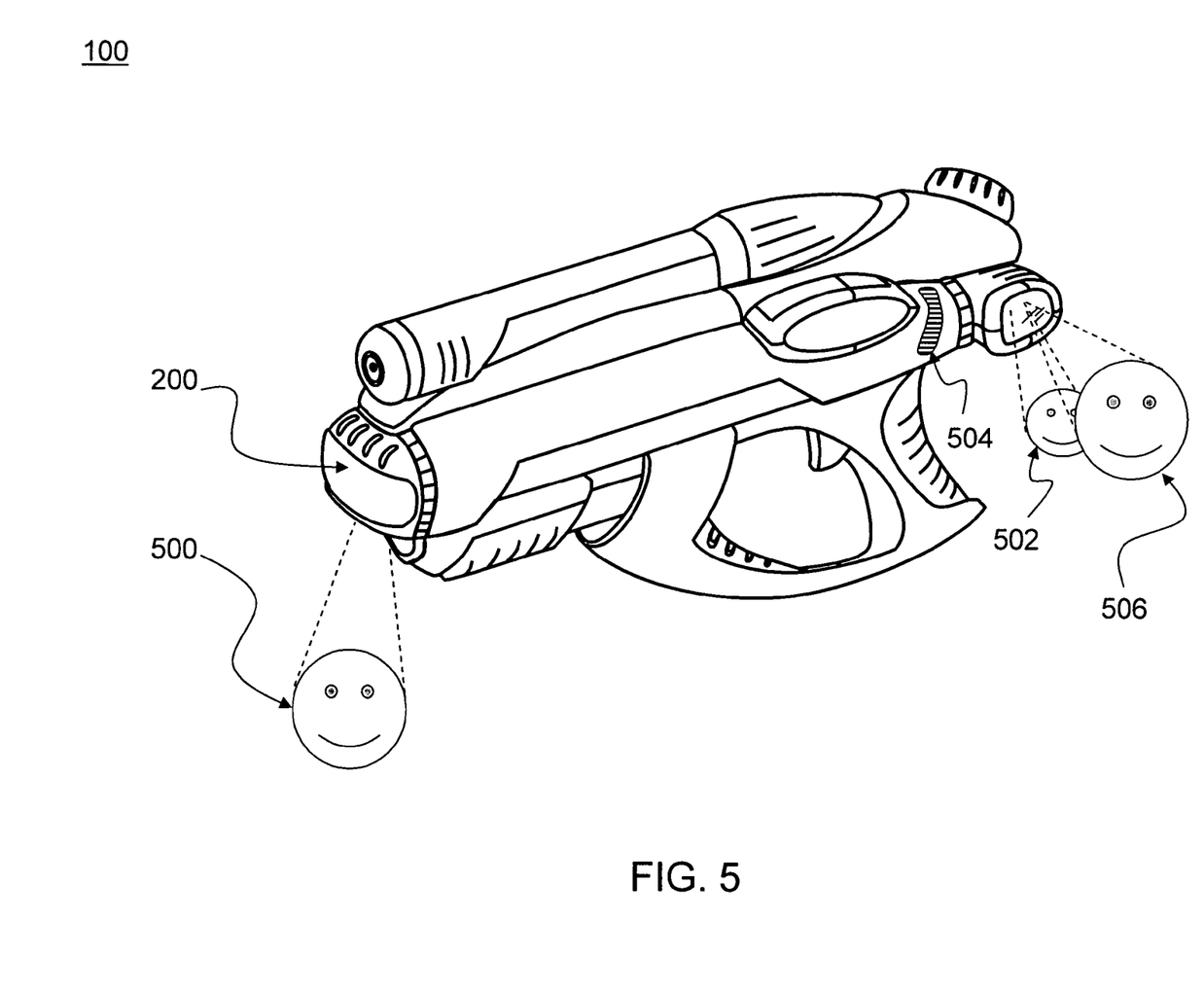
FIG. 5 is a perspective-view illustration of a toy weapon according to the present invention.

As shown in FIG. 5, an object 500 viewed through the periscope has an un-magnified size 502. As can be appreciated by one skilled in the art, a magnifier can be included within the periscope 200 for making the object 500 appear larger (i.e., enlarged object 506) than the un-magnified size 502 of the viewed object 500. In this aspect, the user views distant objects by using the magnifier 504.

The magnifier is any suitable mechanism or device to make an object appear larger than the un-magnified size of the viewed object, a non-limiting example of which includes a magnification lens. A magnification controller 504 may be included to allow a user to control how much to magnify a distant object. Additionally, the periscope 200 may include a plurality of magnification factors. In such an aspect, in order to choose how much to magnify a distant object, a user selects a particular magnification factor from the plurality of magnification factors by using the magnification controller 504.

Figure 6:
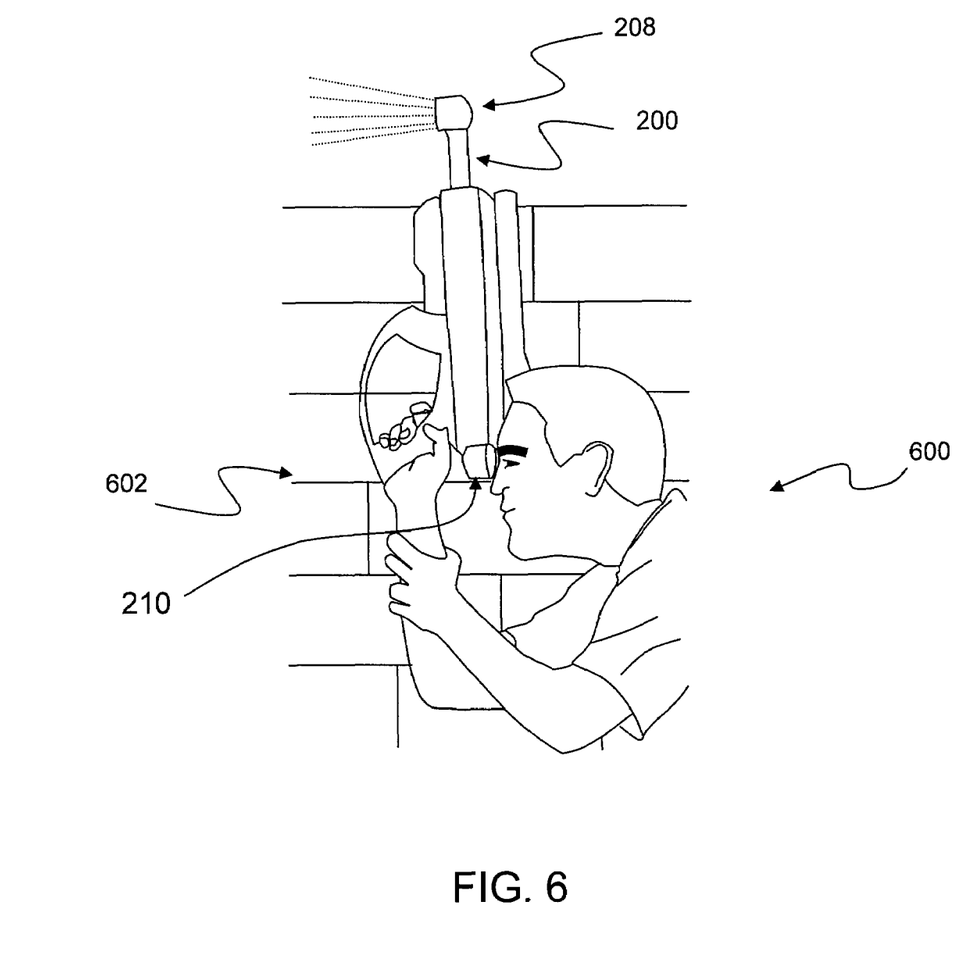
FIG. 6 is a side-view illustration of a user using the toy weapon to view obstructed objects through the periscope.

For further illustration, FIG. 6 shows a user 600 using the periscope 200 to look around an obstruction 602. In this non-limiting example, by placing the viewing piece 208 beyond the obstruction 602 and looking into the eye piece 210, the user 600 can see beyond the obstruction 602.

As can be appreciated by one skilled in the art, the present invention also comprises a method for forming the toy weapon described herein. The method comprises acts of forming a weapon-shaped body; forming a trigger attached with the weapon-shape body; and forming a periscope attached with the weapon-shape body. Additionally, the method further comprises acts of forming and connecting each of the respective parts of the toy weapon to enable it to perform the operations described herein.

What is claimed is:

1. A toy weapon comprising:
    a weapon-shaped body having a barrel with a long-axis;
    a trigger attached with the weapon-shape body, whereby a user activates the trigger with a finger to shoot the toy weapon;
    a periscope having a length with a long-axis, the periscope attached with the weapon-shape body such that the long-axis of the periscope is always in substantial parallel alignment with the long-axis of the barrel; and
    wherein the periscope comprises a front periscope portion, a back periscope portion, a viewing piece, and an eye piece, wherein the viewing piece is connected with the front periscope portion and the eye piece is connected with the back periscope portion, whereby a user views obstructed objects through the periscope by looking through the eye piece.

2. A toy weapon as set forth in claim 1, wherein the toy weapon is formed in a shape selected from a group consisting of: a gun; a rifle; a launcher; a missile gun; laser gun; a machine gun; a bow; and a crossbow.

3. A toy weapon as set forth in claim 2, wherein the toy weapon emits at least one of: water; a pellet; a dart; a paint ball; a laser beam; a toy grenade; a liquid toy compound; a toy quarrel; and an toy arrow.

4. A toy weapon as set forth in claim 3, wherein the periscope further comprises an adjustable length, whereby a user adjusts the length of the periscope in order to see around obstructions of a plurality of sizes.

5. A toy weapon as set forth in claim 4, wherein the viewing piece is oriented at a viewing angle and the periscope further comprises a viewing pivot for adjusting the viewing angle, wherein the viewing piece is attached with the viewing pivot and the viewing pivot is connected with the front periscope portion, whereby a user adjusts the viewing angle by using the viewing pivot in order to see around obstructions.

6. A toy weapon as set forth in claim 5, wherein the periscope is a telescopic periscope.

7. A toy weapon as set forth in claim 6, wherein an object viewed through the periscope has an un-magnified size, and wherein the periscope comprises a magnifier for making an object appear larger than the un-magnified size of the viewed object, whereby a user views distant objects by using the magnifier.

8. A toy weapon as set forth in claim 7, wherein the telescopic periscope further comprises a magnification controller for allowing a user to control how much to magnify a distant object.

9. A toy weapon as set forth in claim 8, wherein the telescopic periscope further comprises a plurality of magnification factors, whereby in order to choose how much to magnify a distant object a user selects a particular magnification factor from the plurality of magnification factors by using the magnification controller.

10. A toy weapon as set forth in claim 9, wherein the eye piece is oriented at an orientation angle and the periscope further comprises an orientation pivot for adjusting the orientation angle of the eye piece, wherein the eye piece is attached with the orientation pivot and the orientation pivot is connected with the back periscope portion, whereby the user adjusts the orientation angle of the eye piece by using the orientation pivot in order to view objects over a tall obstacle and around an obstruction.

11. A toy weapon as set forth in claim 10, wherein the toy weapon comprises a water gun, and wherein the water gun further comprises:
  a pressurized tank for storing water at high water pressure, wherein the pressurized tank is attached with the weapon-shape body, and wherein the pressurized tank further comprises:
    a shooting nozzle for directing a flow of water out of the pressurized tank, wherein the shooting nozzle is connected with the pressurized tank; and
    an openably closable aperture connected with the pressurized tank to enable filling the pressurized tank with a volume of water; and
  a pressure pump for building up the water pressure inside the pressurized tank, wherein the pressure pump is connected with the pressurized tank.

12. A toy weapon as set forth in claim 11, wherein the pressure pump comprises a manual pressure pump, whereby a user slides the manual pressure pump back and forth building up the water pressure inside the pressurized tank during the forward motion of the pressure pump.

13. A toy weapon as set forth in claim 12, wherein the manual pressure pump is a dual-action pump, whereby the dual-action pump builds up the water pressure when a user slides the dual-action pump in a forward motion and also builds up the water pressure when a user slides the dual-action pump in a backwards motion.

14. A toy weapon as set forth in claim 13, wherein the periscope is permanently integrated into the weapon-shape body of the water gun.

15. A toy weapon as set forth in claim 14, wherein the pressurized tank is a molded pressurized tank built using a molding construction technique, wherein the molded pressurized tank is molded in order to build higher water pressure inside the molded tank than the water pressure built inside a non-molded tank, thereby allowing a user to shoot water at a longer distance and with more strength.

16. A toy weapon as set forth in claim 15, wherein the viewing angle of the viewing piece is adjusted from about zero degrees to about 360 degrees.

17. A toy weapon as set forth in claim 16, wherein the orientation angle of the eye piece is adjusted from about zero degrees to about 180 degrees, whereby the user adjusts the orientation angle of the eye piece to approximately 90 degrees by using the orientation pivot in order to view objects over a tall obstacle, the user adjusts the orientation angle of the eye piece to approximately 180 degrees in order to view an object around an obstacle while the user aims forward with the toy weapon using a right handed aim, and the user adjusts the orientation angle of the eye piece to approximately zero degrees in order to view an object around an obstacle while the user aims forward with the toy weapon using a left handed aim.

18. A toy weapon as set forth in claim 1, wherein the periscope further comprises an adjustable length, whereby a user adjusts the length of the periscope in order to see around obstructions of a plurality of sizes.

19. A toy weapon as set forth in claim 1, wherein the viewing piece is oriented at a viewing angle and the periscope further comprises a viewing pivot for adjusting the viewing angle, wherein the viewing piece is attached with the viewing pivot and the viewing pivot is connected with the front periscope portion, whereby a user adjusts the viewing angle by using the viewing pivot in order to see around obstructions.

20. A toy weapon as set forth in claim 19, wherein the viewing angle of the viewing piece is adjusted from about zero degrees to about 360 degrees.

21. A toy weapon as set forth in claim 1, wherein the eye piece is oriented at an orientation angle and the periscope further comprises an orientation pivot for adjusting the orientation angle of the eye piece, wherein the eye piece is attached with the orientation pivot and the orientation pivot is connected with the back periscope portion, whereby the user adjusts the orientation angle of the eye piece by using the orientation pivot in order to view objects over a tall obstacle and around an obstruction.

22. A toy weapon as set forth in claim 21, wherein the orientation angle of the eye piece is adjusted from about zero degrees to about 180 degrees, whereby the user adjusts the orientation angle of the eye piece to approximately 90 degrees by using the orientation pivot in order to view objects over a tall obstacle, the user adjusts the orientation angle of the eye piece to approximately 180 degrees in order to view an object around an obstacle while the user aims forward with the toy weapon using a right handed aim, and the user adjusts the orientation angle of the eye piece to approximately zero degrees in order to view an object around an obstacle while the user aims forward with the toy weapon using a left handed aim.

23. A toy weapon as set forth in claim 1, wherein the periscope is a telescopic periscope.

24. A toy weapon as set forth in claim 1, wherein an object viewed through the periscope has an un-magnified size, and wherein the periscope comprises a magnifier for making an object appear larger than the un-magnified size of the viewed object, whereby a user views distant objects by using the magnifier.

25. A toy weapon as set forth in claim 24, wherein the periscope further comprises a magnification controller for allowing a user to control how much to magnify a distant object.

26. A toy weapon as set forth in claim 24, wherein the periscope further comprises a plurality of magnification factors, whereby in order to choose how much to magnify a distant object a user selects a particular magnification factor from the plurality of magnification factors by using the magnification controller.

27. A toy weapon as set forth in claim 1, wherein the toy weapon comprises a water gun, and wherein the water gun further comprises:
 a pressurized tank for storing water at high water pressure, wherein the pressurized tank is attached with the weapon-shape body, and wherein the pressurized tank further comprises:
  a shooting nozzle for directing a flow of water out of the pressurized tank, wherein the shooting nozzle is connected with the pressurized tank; and
  an openably closable aperture connected with the pressurized tank to enable filling the pressurized tank with a volume of water; and
 a pressure pump for building up the water pressure inside the pressurized tank, wherein the pressure pump is connected with the pressurized tank.

28. A toy weapon as set forth in claim 27, wherein the pressure pump comprises a manual pressure pump, whereby a user slides the manual pressure pump back and forth building up the water pressure inside the pressurized tank during the forward motion of the pressure pump.

29. A toy weapon as set forth in claim 28, wherein the manual pressure pump is a dual-action pump, whereby the dual-action pump builds up the water pressure when a user slides the dual-action pump in a forward motion and also builds up the water pressure when a user slides the dual-action pump in a backwards motion.

30. A toy weapon as set forth in claim 27, wherein the periscope is permanently integrated into the weapon-shape body of the water gun.

31. A toy weapon as set forth in claim 27, wherein the pressurized tank is a molded pressurized tank built using a molding construction technique, wherein the molded pressurized tank is molded in order to build higher water pressure inside the molded tank than the water pressure built inside a non-molded tank, thereby allowing a user to shoot water at a longer distance and with more strength.

32. A toy weapon as set forth in claim 1, wherein the periscope is detachably attached with the weapon-shape body of the water gun.

33. A method for forming a toy weapon comprising:
 forming a weapon-shaped body having a barrel with a long-axis;
 forming a trigger attached with the weapon-shape body, whereby a user activates the trigger with a finger to shoot the toy weapon;
 forming a periscope having a length with a long-axis, the periscope attached with the weapon-shape body such that the long-axis of the periscope is always in substantial parallel alignment with the long-axis of the barrel; and
 wherein the periscope comprises a front periscope portion, a back periscope portion, a viewing piece, and an eye piece, wherein the viewing piece is connected with the front periscope portion and the eye piece is connected with the back periscope portion, whereby a user views obstructed objects through the periscope by looking through the eye piece.

34. A method for forming a toy weapon as set forth in claim 33, wherein in the act of forming the periscope, the periscope is formed with an adjustable length, whereby a user adjusts the length of the periscope in order to see around obstructions of a plurality of sizes.

35. A method for forming a toy weapon as set forth in claim 33, wherein in the act of forming a periscope, the viewing piece is oriented at a viewing angle and the act of forming the periscope further comprises an act of forming a viewing pivot for adjusting the viewing angle, wherein the viewing piece is attached with the viewing pivot and the viewing pivot is connected with the front periscope portion, whereby a user adjusts the viewing angle by using the viewing pivot in order to see around obstructions.

36. A method for forming a toy weapon as set forth in claim 33, wherein an object viewed through the periscope has an un-magnified size, and wherein the act of forming a periscope further comprises an act of forming a magnifier for making an object appear larger than the un-magnified size of the viewed object, whereby a user views distant objects by using the magnifier.

37. A method for forming a toy weapon as set forth in claim 33, wherein in the act of forming a periscope, the eye piece is oriented at an orientation angle and the act of forming the periscope further comprises an act of forming an orientation pivot for adjusting the orientation angle of the eye piece, wherein the eye piece is attached with the orientation pivot and the orientation pivot is connected with the back periscope portion, whereby the user adjusts the orientation angle of the eye piece by using the orientation pivot in order to view objects over a tall obstacle and around an obstruction.

* * * * *